3,751,490
NITROSOBENZENE STABILIZED WITH HEAVY
METAL COMPOUNDS
David Dodman, Malcolm Wilkins, and John Mathers
Woolley, Manchester, England, assignors to Imperial
Chemical Industries Limited, London, England
No Drawing. Filed Jan. 25, 1972, Ser. No. 220,703
Claims priority, application Great Britain, Feb. 22, 1971,
5,095/71
Int. Cl. C07c 81/02
U.S. Cl. 260—647                6 Claims

ABSTRACT OF THE DISCLOSURE

C-nitroso compounds, especially nitrosobenzene, are stabilized by the addition of compounds such as salts or chelates of heavy metals, especially manganese, copper or cobalt.

---

This invention relates to a method for the stabilisation of C-nitroso compounds and stabilized compositions of nitroso compounds.

C-nitroso compounds, particularly nitrosoaryl compounds, are of value as intermediates, for example in the manufacture of antioxidants and dyestuffs. These compounds however are not stable to storage, decomposition occurring on standing both in solution and in the solid state.

According to the invention there is provided a method of stabilizing a C-nitroso compound which comprises adding to the C-nitroso compound in stabilizing amount a compound of a heavy metal.

There is also provided a stabilized C-nitroso compound containing in stabilizing amounts a compound of a heavy metal.

As C-nitroso compounds there are mentioned aliphatic cycloaliphatic and particularly aromatic nitroso compounds, for example nitrosocyclohexane, nitrosobenzene, 4 - nitrosodiphenylamine, N-4-nitrosophenyl-N-phenylhydroxylamine, p-dinitrosobenzene, 2,6-dimethylnitrosobenzene, p-chloronitrosobenzene, m-trifluoro methylnitrosobenzene and α-nitrosonaphthalene.

The C-nitroso compound may be in substantially pure form in liquid or solid state or may be for example in solution in an organic solvent, such as a solution of nitrosobenzene in nitrobenzene obtained by partial reduction of nitrobenzene.

As heavy metals there are mentioned those elements classified as heavy metals on pages 60–61 of Lange's Handbook of Chemistry, revised 10th edition, 1967, published by McGraw-Hill Book Co. The preferred heavy metals are those capable of existing in more than one valency state. As examples of such heavy metals there are mentioned cerium, mercury and, particularly, manganese, copper and cobalt. The term "compound" includes for example salts and chelates.

As salts there are mentioned salts of inorganic acids, such as hydrochloric, hydrobromic and hydriodic and organic acids, such as acetic acid and phenylacetic acid.

As chelates there are mentioned for example the chelate compounds obtained from salts of the metals with acetylacetone and Schiff's bases.

The amount of salt or chelate or other heavy metal compound is preferably between 0.01% and 1% of the weight of nitroso compound, but more or less can be used if desired.

The salt or chelate may be incorporated into the nitroso compound by any conventional method, for example blending with a solid nitroso compound or dispersing or dissolving in a liquid nitroso compound or solution of a nitroso compound.

The invention is illustrated but not limited by the following examples in which all parts and percentages are by weight unless otherwise stated.

EXAMPLE 1

A 20% solution of nitrosobenzene in nitrobenzene is prepared and 1% on the weight of nitroso compound of the cobaltous complex from bis(salicylidene)ethylenediamine is added, the mixture then being stored in the dark at 20–25° C. The rate of loss of nitrosobenzene is compared with that occurring in a control experiment. The following results are obtained:

| | Percent original nitrosobenzene | |
|---|---|---|
| | After 8 days | After 14 days |
| Control | 79.3 | 55.1 |
| Cobalt complex | 99.3 | 84.7 |

EXAMPLE 2

The procedure used in Example 1 is repeated using 50% on the weight of nitrosobenzene of cupric oxide as stabilizer.

Percent original nitrosobenzene after 28 days

Control _____ 49.2
Cupric oxide _____ 92.0

EXAMPLE 3

The procedure used in Example 1 is repeated using 1% on the weight of nitrosobenzene of the following compounds as stabilizers:

| | Percent original nitrosobenzene | |
|---|---|---|
| | After 7 days | After 34 days |
| Control | 81.6 | 39.6 |
| Manganese acetylacetonate | 98.5 | 90.0 |
| Manganese ethylacetoacetate | | 94.6 |
| Mercuric acetate | 99.2 | 86.2 |
| Ceric acetate | 93.9 | 68.5 |
| Cuprous chloride | 97.8 | 94.6 |

EXAMPLE 4

The procedure used in Example 1 is repeated using 1% on the weight of nitrosobenzene of manganese acetate as stabilizer.

Percent original nitrosobenzene after 28 days

Control _____ 49.2
Manganese acetate _____ 92.0

EXAMPLE 5

The procedure used in Example 4 is repeated using 0.25% on the weight of nitrosobenzene of manganese acetate as stabilizer.

| | Percent original nitrosobenzene | |
|---|---|---|
| | After 7 days | After 34 days |
| Control | 81.6 | 39.6 |
| Manganese acetate | 96.2 | 90.8 |

We claim:
1. A composition comprising nitrosobenzene and a stabilizing amount of a compound of a heavy metal which is capable of existing in more than one valence state.
2. A composition according to claim 1, which is in a solution of an organic solvent.
3. A composition according to claim 1, wherein the heavy metal is manganese, copper or cobalt.
4. A composition according to claim 1, wherein the compound of a heavy metal is a salt or a chelate.
5. A composition according to claim 4, wherein the compound of a heavy metal is a chelate with acetylacetone or a Schiff's base.
6. A composition according to claim 1, wherein the amount of the compound of a heavy metal is between 0.01 and 1.0% of the weight of the nitrosobenzene.

References Cited
UNITED STATES PATENTS
3,109,034  10/1963  Guerry _____ 260—647
3,338,966  8/1967   Snyder _____ 260—647 X FOREIGN PATENTS
1,459,756  10/1966  France _____ 260—647

OTHER REFERENCES
Dictionary of Organic Compounds, vol. 4, Eyre & Spottiswoode, Ltd., London, 1965, p. 2505.
Astle, Industrial Organic Nitrogen Compounds, Reinhold Pub. Corp., New York, 1961, p. 338.

LELAND A. SEBASTIAN, Primary Examiner